(12) United States Patent
Bauchot et al.

(10) Patent No.: US 7,924,988 B2
(45) Date of Patent: Apr. 12, 2011

(54) METHOD AND SYSTEM FOR MANAGING VOICE MAIL ACKNOWLEDGEMENT

(75) Inventors: Frederic Bauchot, Saint-Jeannet (FR); Godefroy Dine, Villeneuve-Loubet (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1287 days.

(21) Appl. No.: 11/499,373

(22) Filed: Aug. 3, 2006

(65) Prior Publication Data

US 2007/0121816 A1   May 31, 2007

(30) Foreign Application Priority Data

Sep. 30, 2005   (EP) .................................... 05109048

(51) Int. Cl.
*H04M 11/00* (2006.01)
(52) U.S. Cl. .................................. 379/90.01; 379/88.12
(58) Field of Classification Search ............... 379/90.01, 379/88.12, 88.22, 88.23; 455/413, 412.1, 455/412.2
See application file for complete search history.

(56) References Cited

U.S. PATENT DOCUMENTS

| | | | | |
|---|---|---|---|---|
| 6,888,803 | B1 * | 5/2005 | Gentry et al. | 370/259 |
| 2004/0086095 | A1 | 5/2004 | Dixit et al. | |
| 2005/0186943 | A1 * | 8/2005 | Hasan et al. | 455/413 |

FOREIGN PATENT DOCUMENTS

| | | |
|---|---|---|
| CN | 1549220 A | 11/2004 |
| CN | 1588926 A | 3/2005 |
| FR | 2 855 703 A1 | 12/2004 |
| WO | WO 01/22335 A2 | 3/2001 |
| WO | WO 02/03669 A1 | 1/2002 |

* cited by examiner

*Primary Examiner* — Stella L Woo
(74) *Attorney, Agent, or Firm* — Schmeiser, Olsen & Watts; John Pivnichny

(57) ABSTRACT

A method and system for acknowledging receipt of a voice mail message sent by a first user to a second user and accessed by the second user. The first and second users are respectively connected to a first and second server. Responsive to receiving a request from the first user for an acknowledgment message indicating that the second user has accessed the voice mail message, the second server places an indication of the request in a voice mail box of the second user. After the second user accesses the voice mail message, the second server sends the acknowledgment message to the first server, after which the first server informs the first user that the second user has accessed the voice mail message.

17 Claims, 11 Drawing Sheets

SUBSCRIBER ACKNOWLEDGE TABLE

| SUBSCRIBER | NOTIFY TYPE | NOTIFY ID |
|---|---|---|
| USER 1 | N/A | N/A |
| USER 2 | SMS | MSISDN |
| USER 3 | EMAIL | user3@fr.ibm.com |
| USER 4 | VOICE | N/A |
| ....... | ....... | ....... |

*FIG. 5A*

VOICEMAIL TABLE

| Msg ID | Ack | CALLER MSISDN | RECEIVED DATE | MESSAGE POINTER |
|---|---|---|---|---|
| 1 | NO | 0492116000 | 10/02/2005 12:14:36 | |
| 2 | YES | 0645454545 | 12/02/2005 10:10:15 | |
| 3 | YES | 0193556798 | 12/02/2005 10:15:07 | |
| ...... | ...... | ...... | ...... | |

*FIG. 5B*

METHOD AND SYSTEM FOR MANAGING VOICE MAIL ACKNOWLEDGEMENT

FIELD OF THE INVENTION

The present invention relates to a method and system for acknowledging receipt of a voice mail message sent by a first user to a second user and accessed by the second user.

BACKGROUND OF THE INVENTION

In recent years, communication systems have introduced many new services for consumer user. For example, a voice mail system is used to provide a voice messaging service to the calling party when the called party is unavailable. More particularly, leaving a voice message for a called party is in widespread use in the case of a non-completed telephone call (e.g., where the called party is either busy or otherwise unavailable). Voice messages may in fact be more efficient than telephone conversations where participation of the two parties to a call is not really required to transfer simple information. Voice messaging can be considered a replacement for a human attendant who would otherwise be required to transcribe the message, or for a simple analog recording device (answering machine) that can be connected to a called telephone.

This feature is offered by the telephone service providers both for the fixed line telephone and for the mobile telephone networks (GSM, GPRS, UMTS, . . . ). Therefore, it is important to offer to the users of such fixed or wireless terminal equipment means by which they can be notified as soon as the Voice mail has been read by the called party.

Referring to FIG. 1, the infrastructure of voice carriers today is based on hierarchical circuit equipment (TDM), with Local Exchange Switches (Class-5) 110 managing voice services for telephone with answering machine 100 and the Transit Switches (Class-4) 120 managing call routing.

The Local Exchange Switch 110 is a complex device handling 3 main tasks; namely: (1) subscriber connectivity to the provider network via analog or ISDN lines; (2) delivery of phone services such as dial tone, digits analysis, Call Detail Records generation, call waiting, call transfer, call conferencing, caller ID, etc.; and (3) connectivity to the core network of the provider with transit/tandem switching functions (Class-4) and network signalling (SS7).

Next Generation Networks (NGN), which are the new communication network architecture, are shown in FIG. 2. The principle is to use packet mode transmission technologies, reserved up till now for data, to transport all the various types of telecommunication services. In addition, interfaces are separated from the different layers of the communication network (transmission layer 220, control layer 210 and service layer 200) to allow for a greater evolution of the network. Finally, NGN uses the new packet technologies to offer broad band services.

The NGN includes in the service layer 200 a central service server 201, and in the control layer a media gateway controller 211. The transport layer 220 includes an IP Switch core network 225 which is connected to a signaling gateway 230. The IP Switch core network 225 includes connections to a Digital Subscriber Line Access Multiplexer (DSLAM) 240, a content transmission management system (CMTS) 250, and voice over IP (VoIP) 260 connection. The signaling gateway includes connection to the Public Switched Telephone Network (PSTN) 235 by SS7 to other telcos and ISDN PRI to a customer PBX. This type of system includes all the normal types of services and applications available to a user, for an example voice mail, call waiting, caller ID etc.

The voice mail system operates to give messages to a user that a person has called and then the user contacts the person who made the call at a time which is convenient to the user. Sometimes the user forgets to call or just doesn't bother to call.

The person who made the call may call several times in case the person has missed a reply or if the person needs an urgent reply. The person making the call has no way of knowing if the user has listened to voice mail or read another type of mail.

SUMMARY OF THE INVENTION

The present invention provides a method of providing acknowledging of receipt of a voice mail message sent by a first user to a second user and accessed by the second user, said first user being connected to a first server, said second user being connected to a second server, said method comprising:

receiving, by the second server, a request from the first user for an acknowledgment message indicating that the second user has accessed the voice mail message sent by the first user to the second user;

responsive to said receiving the request, placing an indication of the request in a voice mail box of the second user, said placing the indication of the request performed by the second server; and responsive to the second user accessing the voice mail box of the second user to receive the voice mail message and responsive to the indication of the request in the voice mail box of the second user, sending the acknowledgment message to the first server, said sending the acknowledgment message performed by the second server.

The present invention provides a method of receiving acknowledging of receipt of a voice mail message sent by a first user to a second user and accessed by the second user, said first user being connected to a first server, said second user being connected to a second server, said method comprising:

receiving, by the first server from the second server, an acknowledgment message from the second server, said acknowledgment message indicating that the second user has accessed the voice mail message sent by the first user to the second user; and responsive to said receiving the acknowledgment message, informing the first user that the second user has accessed the voice mail message sent by the first user to the second user, said informing the first user performed by the first server.

The present invention advantageously provides a method and system by which the calling party is assured of receiving an acknowledgement message as soon as the called party receives the voice mail message. There is no need for the calling party to make multiple calls or leave lots of messages.

BRIEF DESCRIPTION OF THE DRAWINGS

FIGS. 5A and 5B show tables for use with the system of FIGS. 3 and 4, in accordance with embodiments of the present invention.

DETAILED DESCRIPTION OF THE INVENTION

The present invention provides a method of managing a voice mail system in order to send an acknowledgement to the calling party as soon as the called party listens to voice mail message from their voice mail box.

Figure 1:
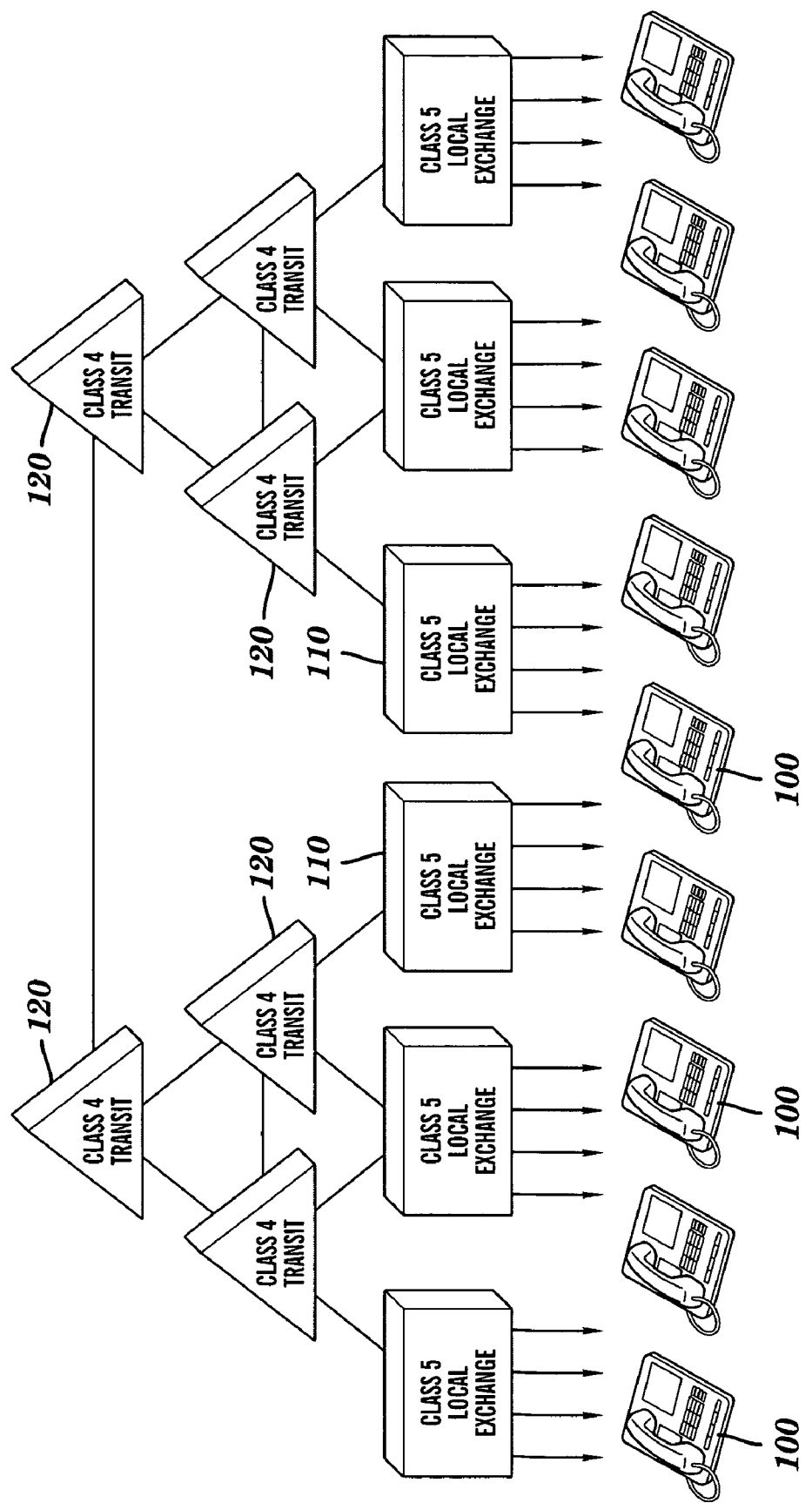
FIG. 1 is an example of a current day voice carrier infrastructure.
Figure 2:
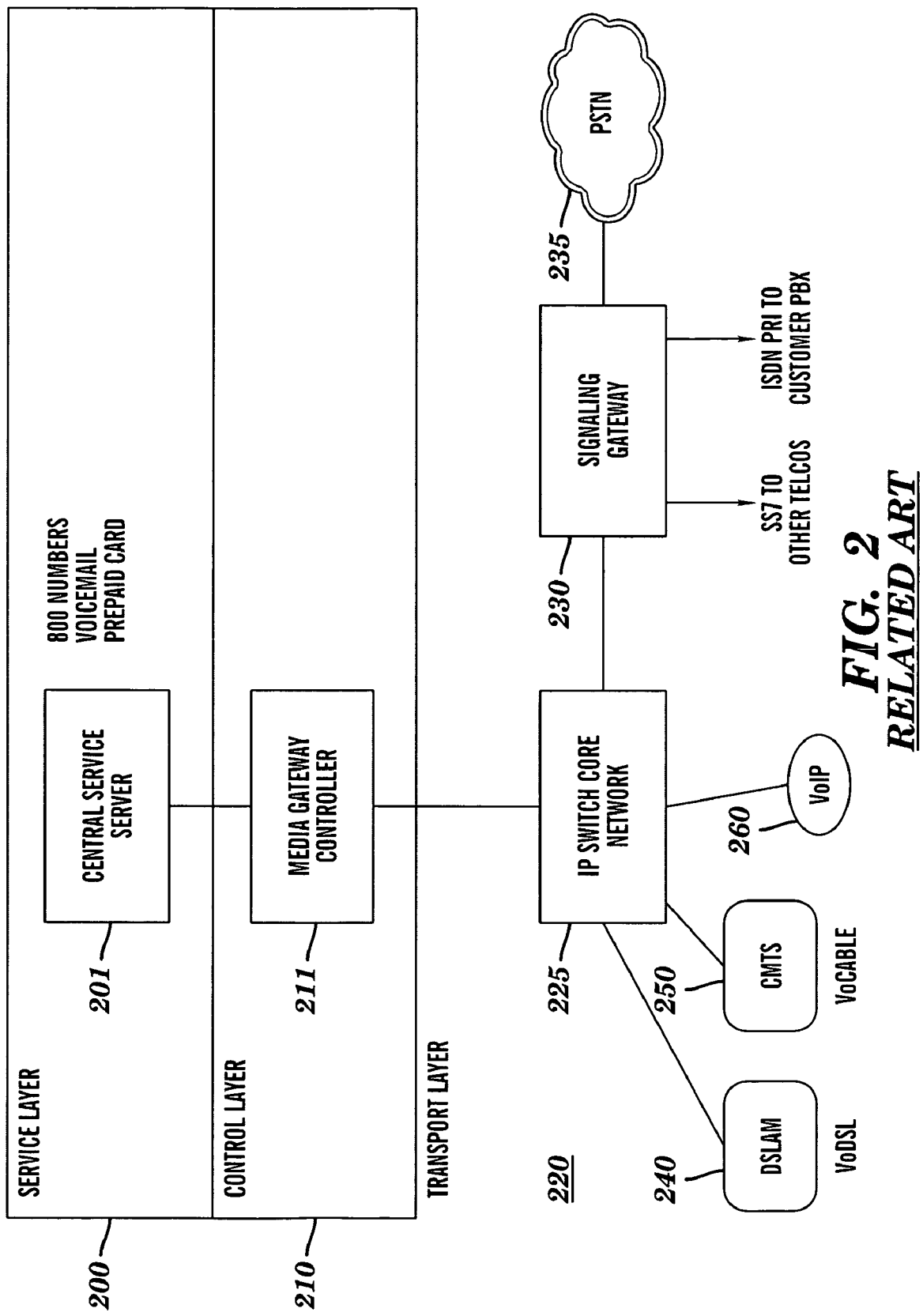
FIG. 2 is a schematic diagram of a next generation network.
Figure 3:
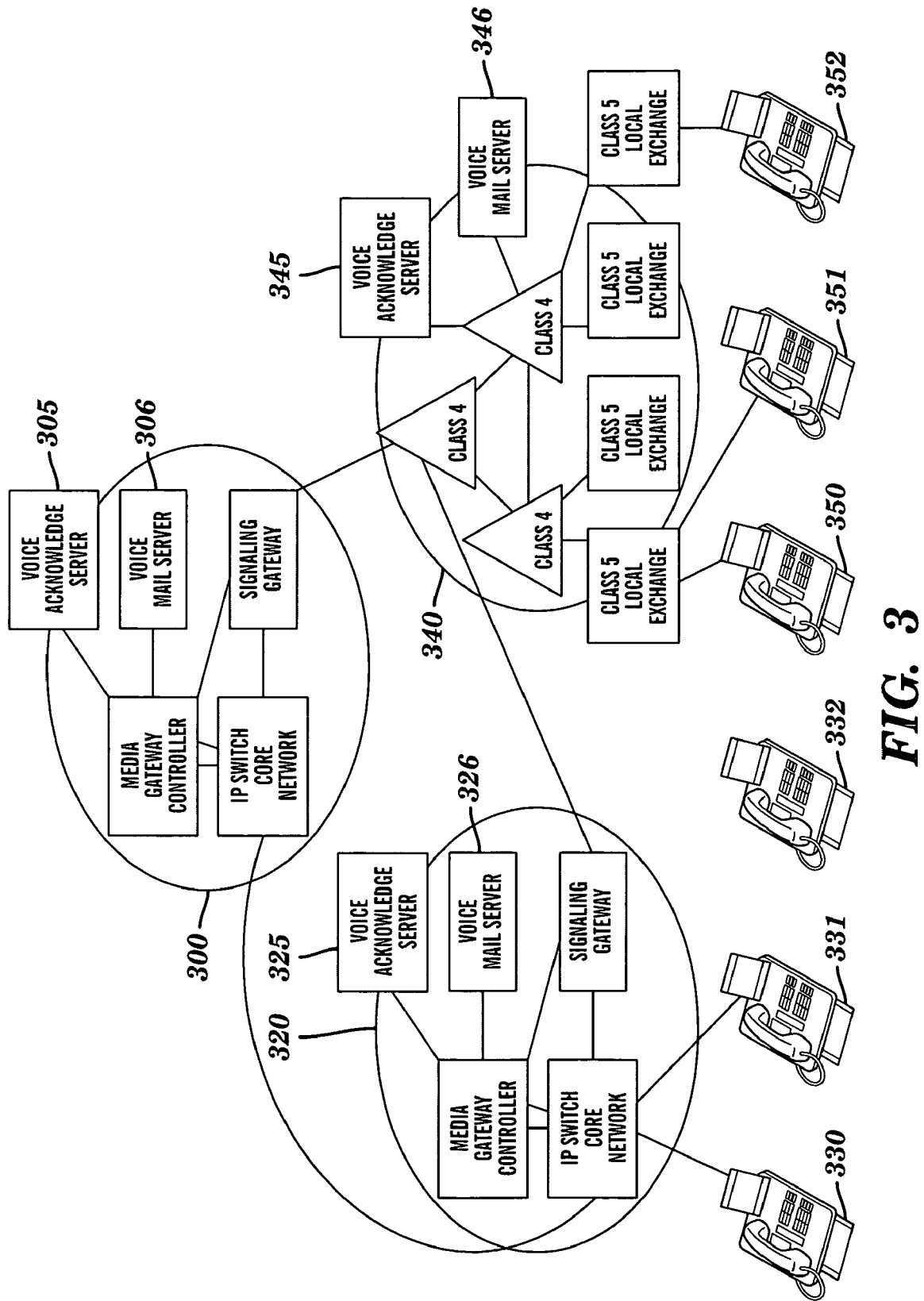
FIG. 3 is a block diagram showing a system of a voice mail acknowledgement, in accordance with embodiments of the present invention.

Referring to FIG. 3 and in accordance with the international numbering plan, telephone sets are brought together in groups. In this document such a group is referred to as Voice mail User Group (VUG). VUG groups may be based either on hierarchical network using a TDM transmission architecture 340 or on a New Generation Network (NGN) architecture 300 and 320. In general a voice mail server is associated with a voice mail user group 306, 326 and 346, to offer a voice message service to the users of that VUG. According to an embodiment of the present invention, a new server type is added in each VUG group to support the voice mail read acknowledge system of the present invention. These are the "Voice mail Read Acknowledge" servers 305, 325 and 345, which are coupled to telephones with answering machines 330, 331, 332, 350, 351, 352 as shown.

For a voice mail service, a new user subscribes to the service. This subscription may be free or at a fixed charge depending of the requirements of the operator. At the point of subscription, a voice mail box is created for the user. This process allocates storage space to record audio messages and defines several parameters such as for example the number or outstanding messages, the length of time, the type of notification given when an audio message is put in the voice mail box, the welcome message, and many other features.

Figure 4:
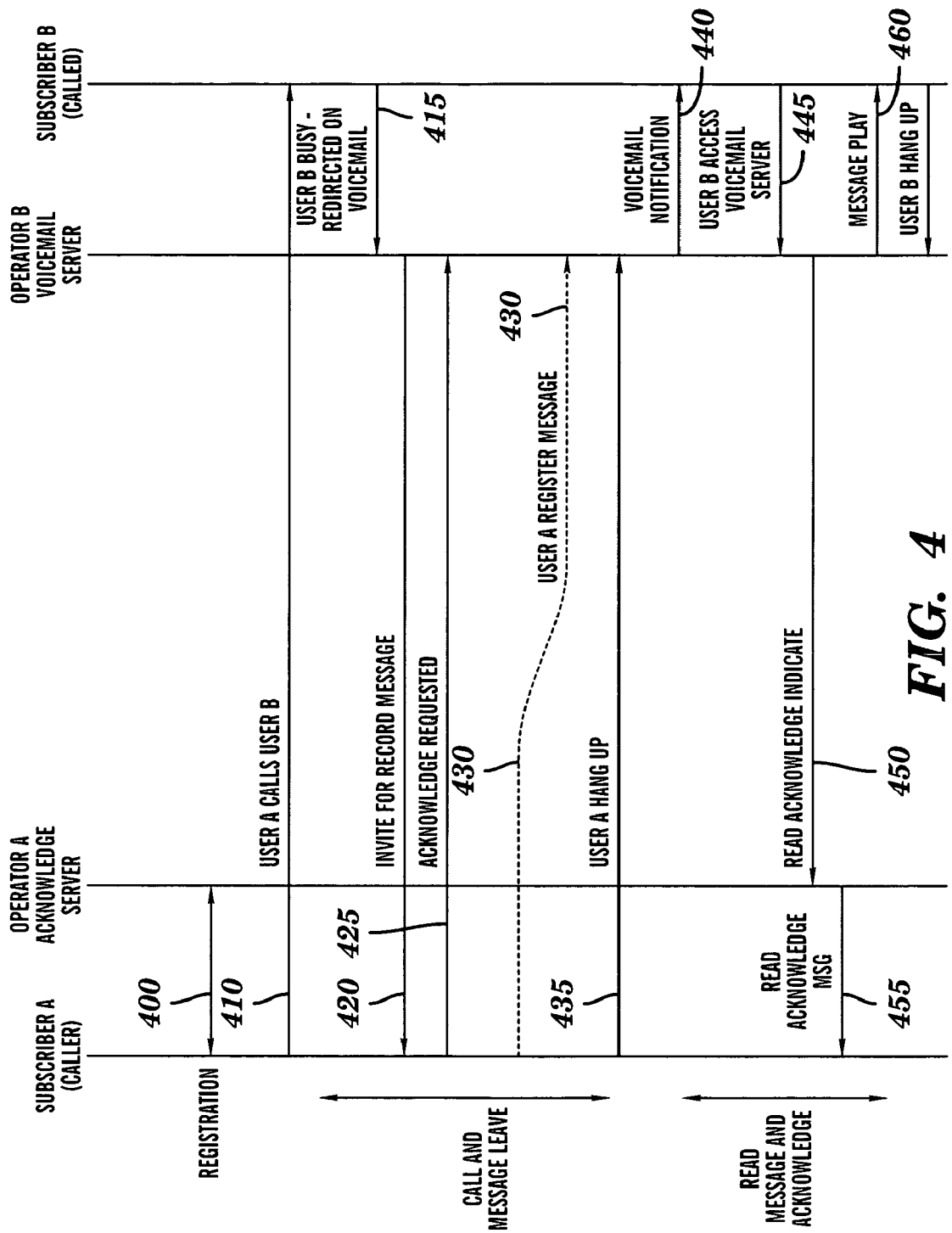
FIG. 4 is a message flow for the system of FIG. 3 and shows method steps of the message flow process, in accordance with embodiments of the present invention.

For the voice mail read acknowledge service, the service may be available to all users without any subscription. The read acknowledge service itself is managed by the remote voice mail server belonging to the called party VUG group. However as shown in FIG. 4, the subscriber may modify the way in which the acknowledge message is sent. This registration comprises the means to be used to send the read voice mail acknowledgement to the caller and the information to send. Several means may be used for example Short Message Service (SMS), E-mail, Audio, etc. In case of notification by SMS or by Audio, the MSISDN to be used has to be defined, while for E-mail notification, the E-mail address has to be defined. MSISDN stands for Mobile Station ISDN number, wherein ISDN stands for Integrated Services Digital Network.

FIG. 5A shows the Subscriber Acknowledge Table 500 which is accessible to each voice mail server in the system of FIG. 3. Each row 501-504 of Table 500 represents a User. The column Subscriber 510 identifies the user by the user's own MSISDN. The column Notify type 520 indicates the means to be used to send the acknowledgement messages to the user listed in column 510. The column Notify ID 525 specfies information about the address to which to send this acknowledgement message. When several types of notification are requested by the same user, an entry by notification type is created in the table 500. So the same user may appear several times in the table 500. Thus, Table 500 may comprise different modes for contacting each user listed in Table 500. Alternatively the user may specify a priority order for the type of notification to try first in consideration of the different modes for contacting a given user in Table 500.

When there is no registration for a user in the Table 500, the read voice mail acknowledgement may be sent by a mechanism not utilizing information in the Table 500, such as by a call to the MSISDN caller. The call to the MSISDN caller is triggered by the voice mail server of the VUG group comprising UserA. A text to speech server indicates that the message made by the caller to a specific party and identified by the date (DD:MM:HH:MM) has been accesed. Referring again to FIG. 4, at step 410, the user a (UserA) calls the user b (UserB). If UserB is busy or is not responding, the call made by UserA is redirected in step 415 to the voice mail server of UserB. In step 420, the voice mail server of the VUG group comprising UserB invites UserA to record a message using an audio response unit and determines if an acknowledgement is needed when the message is received by UserB. In step 425, UserA requests an acknowledgement, wherein the request for the acknowledgement may be made: by a vocal response to a question; by DTMF (Dual Tone Multi Frequency) generated by typing a code with the telephone keys; or by other means. At step 430, UserA records a message in the voice mail box of UserB. When UserA hangs up the telephone in step 435 (i.e., when the mail box server of the VUG group comprising UserB receives an indication that UserA is disconnected from the mail box server of the VUG group comprising UserA), the voice mail server of UserB creates an entry in the voice mail table 550 of FIG. 5B within the voice mail box of UserB.

The voice mail table 550 includes a MsgID 560, an Ack field 565, caller MSISDN 570, received date 575, and message pointer 580. The MsgID 560 is a unique identifier of the message. The Ack field 565 is a Boolean variable indicating if a read acknowledge has been requested by the caller. The Caller MSISDN 570 identifies the user leaving the message in the voice mail box. The Received Date 575 of the message may be (in one embodiment) in for example the form DD:MM:YY:HH:MM, where DD is the day, MM is the month, YY denotes the year, HH denotes the hour, and MM denotes the minute. The Message Pointer 580 points to the file containing an audio message.

In step 440, the called party UserB is notified that a new message is waiting in the voice mail box of UserB. This notification may be made by any of the classical means used by the voice mail server such as for example an SMS sent using an MSISDN configured in the Voice mail box profile, an E-mail using also an E-mail address in the Voice mail box profile, an audio message, textual information displayed on telephone equipment screen, lights blinking, etc. Later in step 445, UserB accesses the voice mail box and receives the message. Responsive to UserB having accessed the voice mail box to receive the message, if the Acknowledge flag 565 of the voice mail table 550 (see FIG. 5B) indicates that a read acknowledge has been requested, the voice mail server of the VUG group comprising UserB sends (in step 450) a "Read Acknowledge Indicate" (RAI) message to the Acknowledge server of the VUG group comprising UserA. A "Read Acknowledge Indicate" message may contain the following fields: Caller MSISDN; Called MSISDN; Date of audio message creation (DD:MM:YY:HH:MM) by UserA; and Date of audio message delivery (DD:MM:YY:HH:MM) to UserB.

On receiving the "Read Acknowledge Indicate" message, the Acknowledge server of the VUG group comprising UserA consults the subscriber acknowledge table 500, using the Caller MSISDN to recognise the entry 510 of UserA. If no entry is found, a call to the Caller MSISDN of UserA retrieved from the "Read Acknowledge Indicate" message is made indicating that the audio message left (at date of audio message creation) for UserB corresponding to the called MSISDN has been accessed by UserB (at the date of audio message delivery). If one or several entries are found, several notifications are made to the Caller MSISDN of UserA using the means specified by the Notification Type field 520 and the Notification ID 525. In addition, a certain priority of required notification means for UserA may exist which can be used to select the preferred means of notification, for example at different times of the day.

The transmission of the Read Acknowledge Indicator (RAI) (step 450 of FIG. 4) from the Voice mail Server (VMS) to the Acknowledge server (AS) is now described in more detail. As this is a novel type of transmission, the RAI will impact or be impacted by a number of network elements and network standards. These impacts are identified in more detail below. The Voice mail Server (VMS) and Acknowledge server (AS) are considered as two nodes of two different SS7 networks, but obviously could be considered differently in different circumstances.

Common Channel Signalling System No. 7 (SS7 or C7) is a global standard for telecommunications defined by the International Telecommunication Union (ITU) Telecommunication Standardisation Sector (ITU-T). The standard defines the procedures and protocol by which network elements in the public switched telephone network (PSTN) exchange information over a digital signalling network to effect wireless (cellular) and wire line call set-up, routing and control.

Each signalling point in the SS7 network is uniquely identified by a numeric signalling point code (SPC). SPCs are carried in signalling messages exchanged between signalling points to identify the source and destination of each message. Each signalling point uses a routing table to select the appropriate signalling path for each message.

There are certain kinds of signalling points in the SS7 network, SSP (Service Switching Point), STP (Signal Transfer Point), SCP (Service Control Point) and IP—Intelligent Peripherals. An Intelligent Peripheral is a IN (Intelligent Network) term given to a device that interacts with a user or subscriber and functions to play announcements, collect dialed digits or "grunt responses" from the user of the service.

The VMS and AS of the present invention are IP Nodes. They are uniquely identified by an unique PC (Point Code) in their respective SS7 network and thus they can communicate with SS7 stack facilities.

Figure 6:
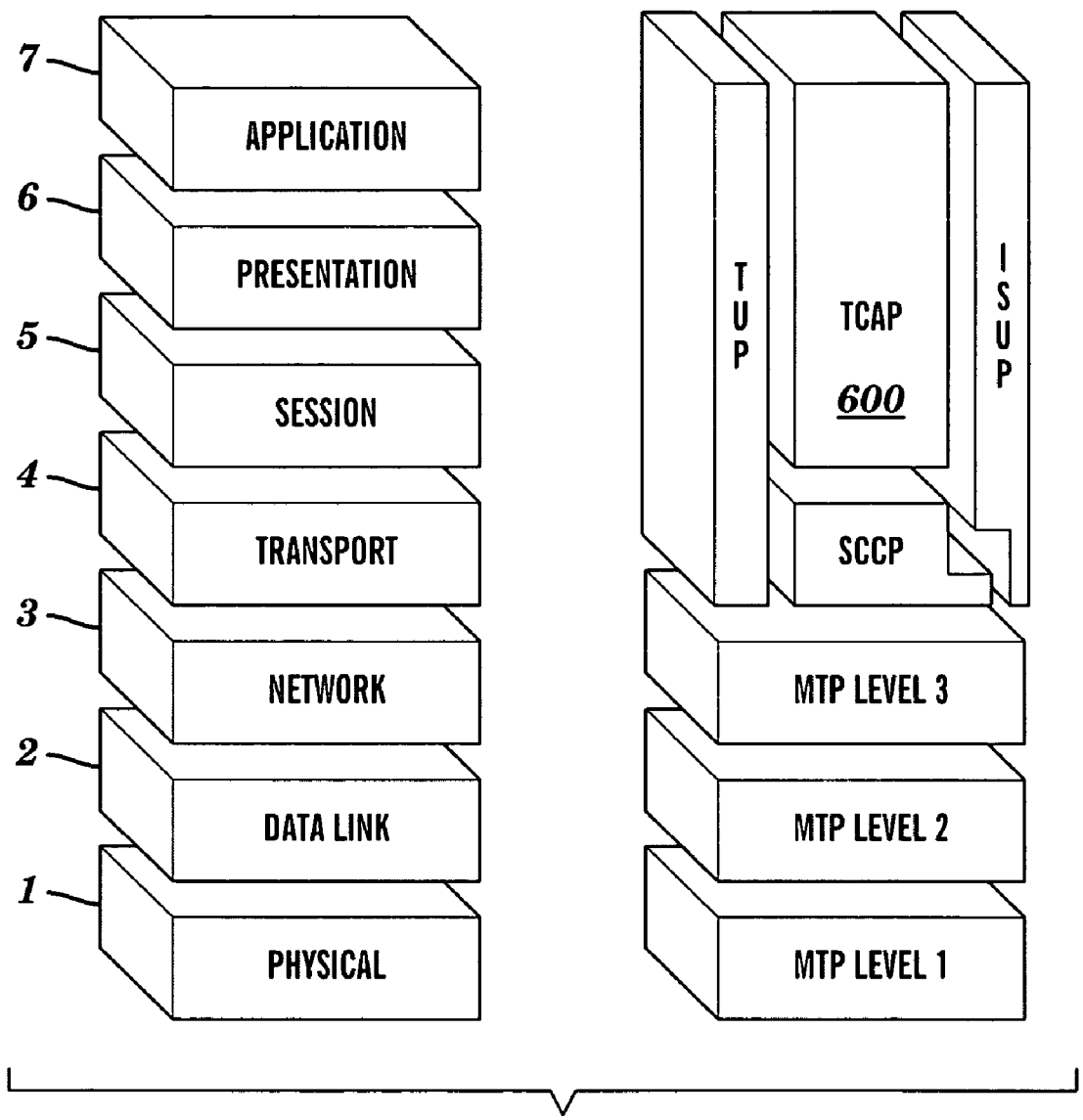
FIG. 6 shows the OSI reference model and the SS7 protocol stack, in accordance with embodiments of the present invention.

FIG. 6 shows the OSI reference model and the SS7 protocol stack and is used here to help identify elements etc. which are impacted by the transmission of the read acknowledge indicator (step 450).

For the transmission of the "Read Acknowledge Indicate" in step 450, signalling message in the present invention Transaction Capabilities Applications Part (TCAP) 600 is used.

TCAP supports the exchange of non-circuit related data between applications across the SS7 network using the Signalling Connection Control Part SCCP connection less service. For instance, queries and responses sent between SSPs and SCPs are carried in TCAP messages.

Figure 7:
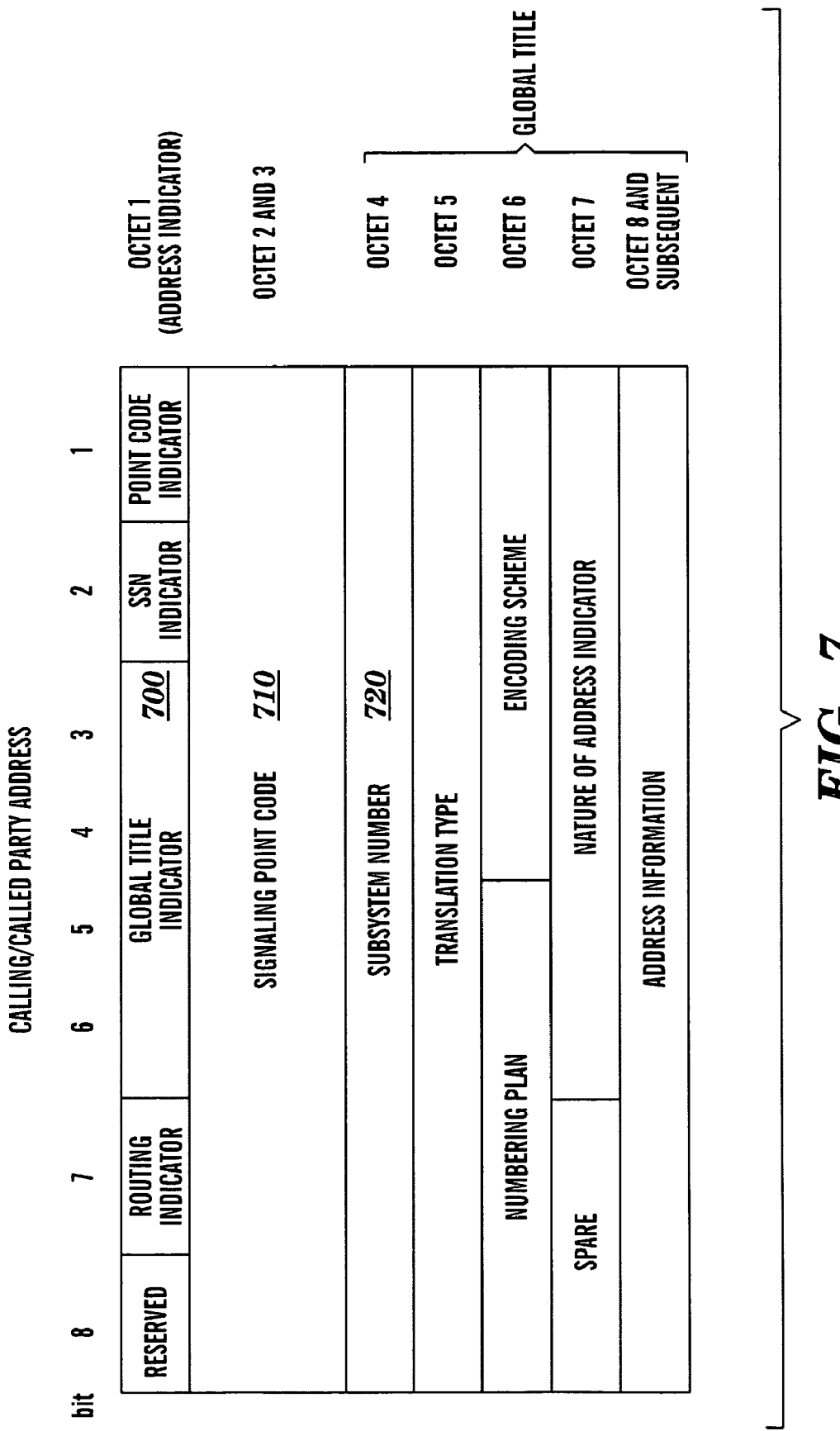
FIG. 7 shows the SCCP header, in accordance with embodiments of the present invention.

Another space which is impacted is the SCCP. The SCCP header is shown in FIG. 7. A global title 700 is an address (e.g., a dialed 800 number, calling card number, or mobile subscriber identification number) which is translated by SCCP into a signalling point code 710 and subsystem number 720. A subsystem number uniquely identifies an application at the destination signalling point.

SCCP provides an advanced addressing capability where a subsystem is represented as an array of digits known as a Global Title. The Global Title is a method of hiding the SS7 signalling point code 710 and subsystem number 720 from the originator of a message, for example in inter-working between different networks where there is no common allocation of SS7 point codes. Such a method is used in GSM mobile systems roaming between different countries.

Figure 8:
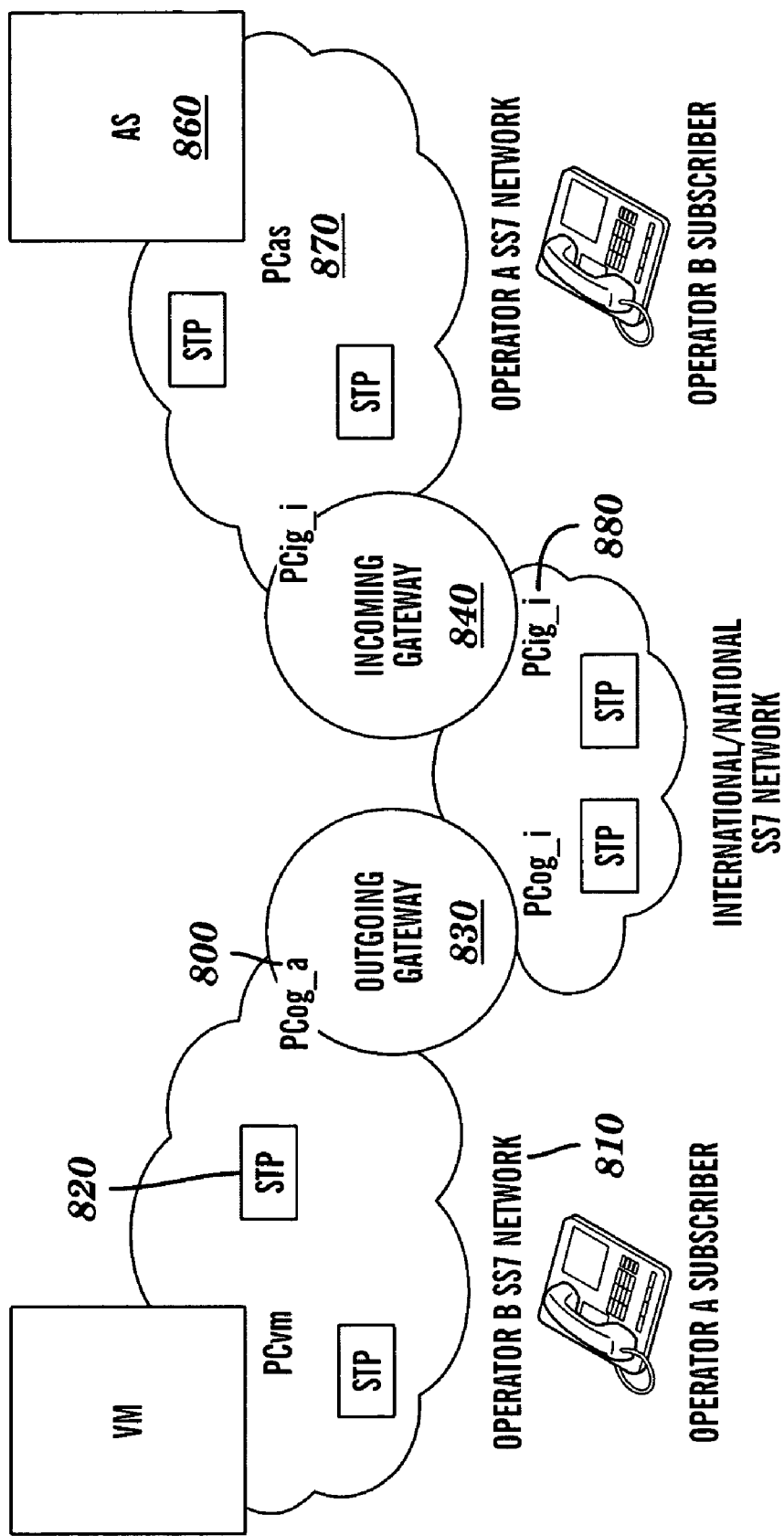
FIG. 8 shows the network used for transmission of the Read Acknowledge Indicator (RAI) from the Voice mail Server (VMS) to the Acknowledge server (AS), in accordance with embodiments of the present invention.

Depending on network topology, Global Titles are translated either at a STP or at a gateway exchange where a network has an inter-working function with an adjacent network. The addressing information delivered to SCCP for message routing may therefore contain a destination point code and a subsystem number or a global title. For successful message transmission, the minimum requirement is for a destination point code in order for the message to leave the SCCP node. If none is present, the called address information is submitted for Global Title Translation. This will produce as a minimum a destination point code and optionally a subsystem number or new global title. The called address information in a received message contains a routing indicator to instruct SCCP to route on either point code and subsystem number or Global Title (if present). If set to route on Global Title, the called address is submitted for translation to produce a new destination address, which may be the local node or a different SCCP node in the network (which may itself translate the address information again). FIG. 8 is a diagram showing the network which is assumed for this. The read acknowledge indicator (RIA) must be routed from the UserB voice mail server VM to the UserA Acknowledgement Server AS, through different SS7 networks. However the VM does not know the point code of the intended AS. It only knows a UserA ISDN. This ISDN will be use as a Global Title to infer the destination AS point code. This translation is done by STPs that are connected to two different SS7 networks. Those STPs have some dialing plan by which they can deduce the operator that owns the UserA ISDN.

Point codes are like private IP address in a LAN. Messages with destination point code Pcog_a 800 in the Operator B SS7 Network 810 can only be forwarded by an STP 820 belonging to that network. They can not be forwarded by the international STPs or Operator A STPs.

The point code translation is carried out by Gateways 830, 840 in a more or less similar way to a router carrying out NAT between a LAN and a WAN for the translation of private IP addresses to public IP addresses which can be routed on that WAN. The PC "translation" is done here by SCCP and the Global Title treatment mechanism.

The process by which RAI goes from the VMS of UserB to the AS of UserA:

a) Operator A subscriber leaves a message on VMS of UserB.

b) Operator B subscriber reads this message on VMS.

c) The operator B VMS then sends a RAI message encapsulated in a TCAP message to the TCAP Outgoing Gateway with the Global Title (GT)="subscriber ISDN", a routing type, and the translation type="Acknowledge Server". This field "routing type" tells the receiving node what kind of addressing information to look for. With a binary value "xx0010xx" the Outgoing Gateway will look at the GT value in order to deduce the Destination Point Code of the message in its routing table (i.e. Pcig_i) 850. The RAI message is coded in ASN.1 (Abstract Syntax Notation Number One).

Detailed information for definitions of the operations, errors and types required for the Acknowledge Server SMS using ASN.1 is specified in ITU-T Recommendation X.680 and uses the OPERATION and ERROR macros as defined in ETS 300 287.

d) The outgoing gateway 830 carries out an analysis of the GT and forwards this signalling message to the operator A Incoming Gateway 840 (the point code Pcog_i has a source point code and PCig_i has DPC).

e) The Incoming GW 840 carries out an analysis of the GT (because of the "routing indicator" field value) and forwards this signalling message to the point code of its subscriber AS 860, PCas 870 (the point code has a source address Pcig_i 880).

f) The AS receives the TCAP message "RAI", updates the table 500 of FIG. 5A, and forwards the Message Acknowledge indicator by the ways chosen by the subscriber.

Figure 9:
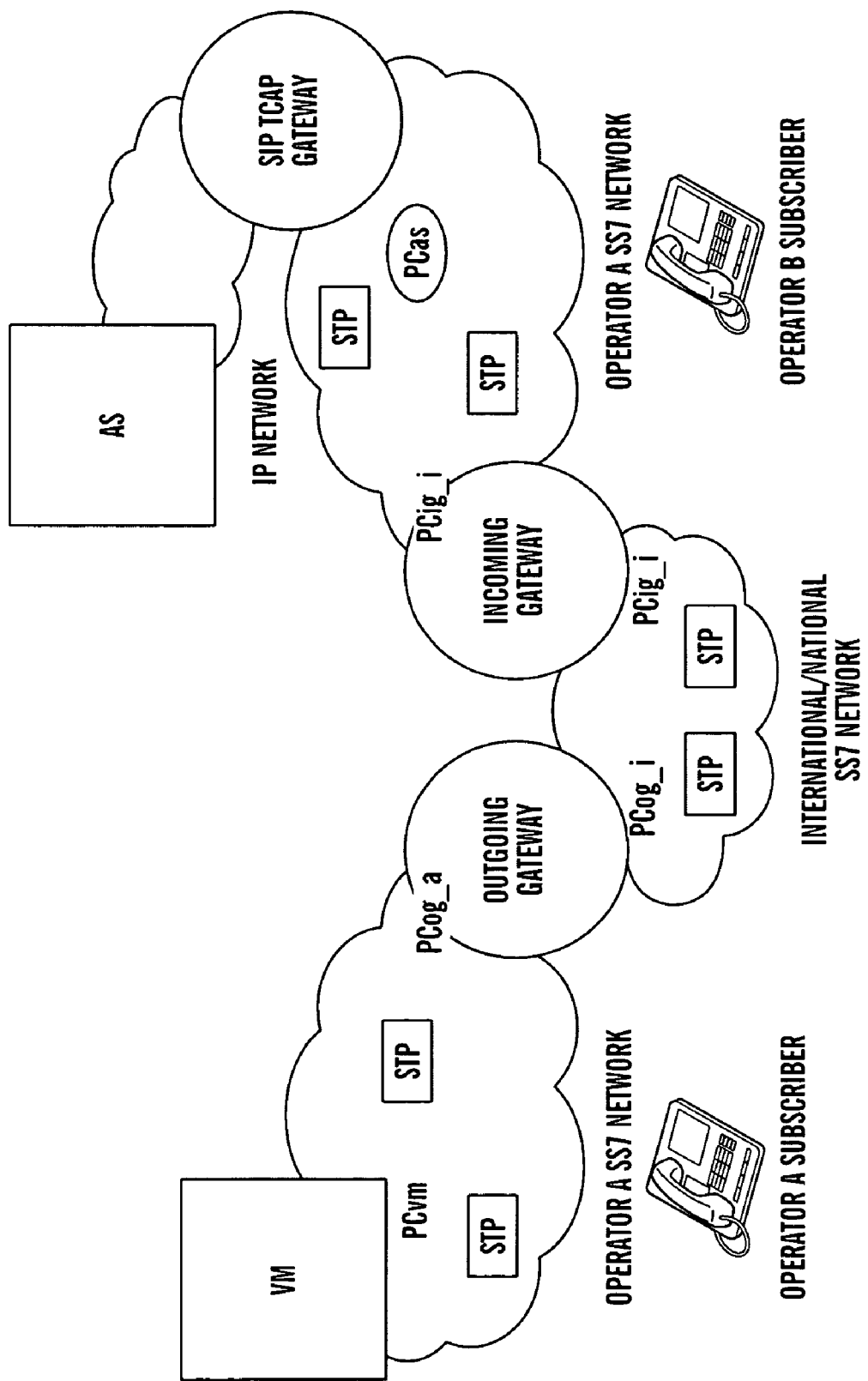
FIG. 9 shows the network used with SIP signalling, in accordance with embodiments of the present invention.
Figure 10:
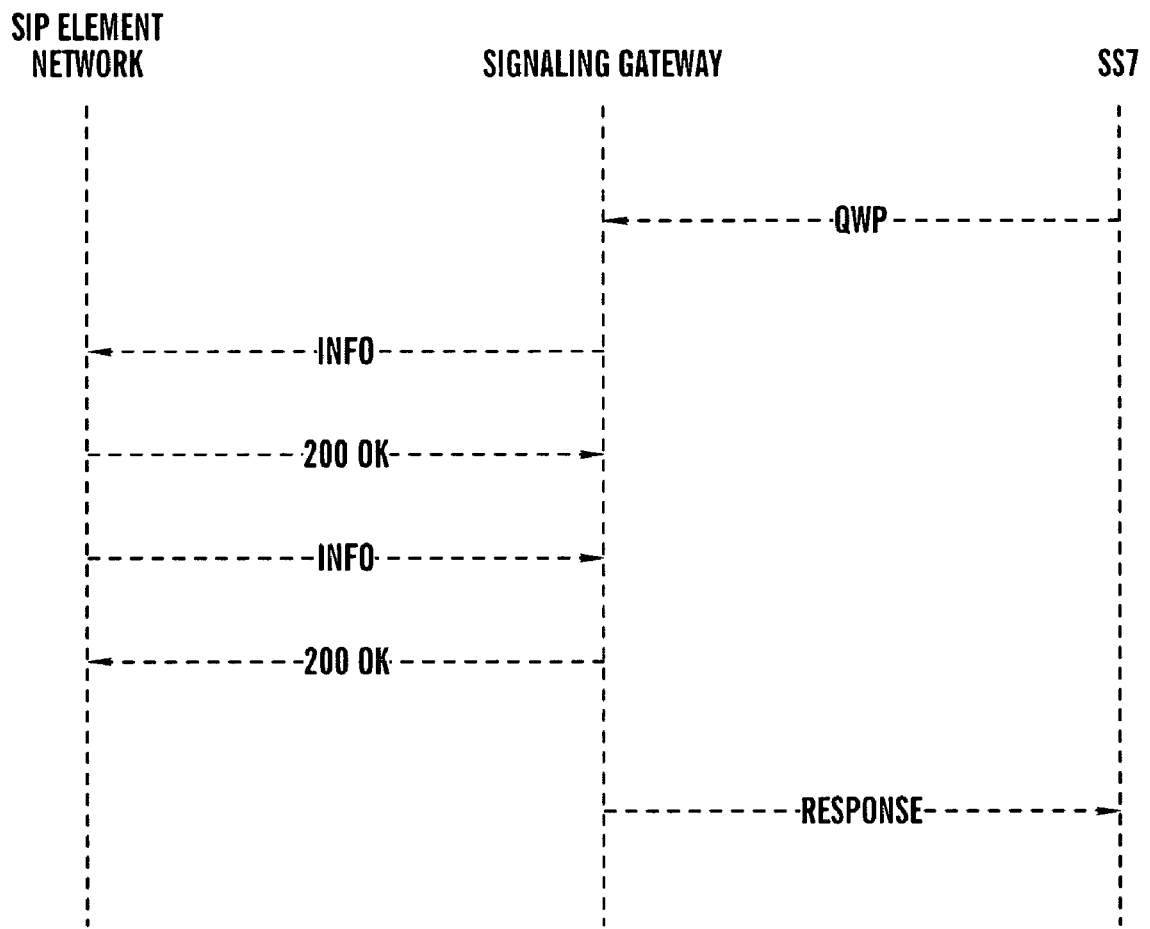
FIG. 10 shows a SS7 Originated Query Example, in accordance with embodiments of the present invention.

If one of the VMS or the AS is only able to use SIP signalling, a SIP-TCAP gateway could be used as shown in FIG. 9. In this example, the basic approach is to provide an Extension Mark up Language (XML) representation of the TCAP messages that can be encapsulated in the body of SIP INFO messages. A detailed description of the dialog that the SIP-TCAP conducts in the case of a SIP AS is known, but at high level is shown below with respect to FIG. 10.

In this case, the process by which RAI goes from the VMS of UserB to AS of UserA is as follows:

a) Operator A subscriber leaves a message on VMS.

b) Operator B subscriber reads this message on the VMS.

c) The operator B VMS sends a RAI message encapsulated in a TCAP message to the TCAP Outgoing Gateway 1000 with the Global Title (GT)="subscriber ISDN" and the translation type="Message Waiting".

d) The outgoing GW does an analysis of the GT and forwards this signaling message to the operator A Incoming Gateway 1010 (with a point code that has a source address).

e) The Incoming GW 1010 does an analysis of the GT and forwards this signalling message to the point code of the SIP-TCP GW 1020 (the point code has a source address).

f) The TCAP message leaves SSCP and is forwarded to VMS through SIP INFO messages over user datagram protocol (UDP). In this case there is a link between the GT and the acknowledgement server AS IP address.

g) The AS receives the TCAP message "RAI", updates the table (cf FIG. 5A) and forwards the Message Acknowledge indicator as chosen by the subscriber A.

Referring again to FIG. 4, a flow chart is shown which identifies the steps of the process according to the current invention as follows.

UserA is the caller, UserB is the called party and certain parts of the process are carried out by the operator (A or B).

The first step 400 is that UserA must subscribe to the voice ACK service.

The operator then makes a record of UserA in the Subscriber Acknowledge table 500. The record includes details of the notification type and the ID of that notification type.

At some time in the future UserA calls UserB in step 410.

UserB is not available and as such an unreachable condition is met for the call from UserA to UserB.

Then the call is redirected to the voice mail server of UserB in step 415 which asks UserA if a voicemail read notification should be sent when the message is read, and step 420 invites UserA to record a message for UserB. This occurs even if UserA does not have an acknowledgement service.

It is assumed in this scenario that UserA requests a Voicemail Read Acknowledgement in step 425.

In step 430, the message from UserA is then recorded in the message table 550 on the voice mail server of UserB and an acknowledgement required flag is enabled in table 500.

UserA may replay the message and/or re-record the message, as normally provided by voice mail systems.

Once UserA is comfortable with the recorded message, UserA hangs up and the call from UserA to UserB is thus terminated in step 435.

At some time later in step 445, UserB checks for voice mails on the voice mail system. The voice mail system of the VUG group comprising UserB may also notify UserB that there are voice mails on the system.

The voice mail server looks up in the message table and discovers a message and an associated acknowledgement flag.

The voice mail message is then played to UserB at step 460.

Since there is an acknowledgement flag associated with the message, a notification (Read Acknowledge Indicate) that the voice mail has been listened to is sent in step 450 to UserA Acknowledge server. In step 455, the Acknowledge server, using the means identified in the subscriber acknowledge table 500, informs UserA that the message left in the User B Voicemail box has been read.

While the invention has been particularly shown and described with reference to a embodiments herein, it will be understood that various changes in form and detail may be made without departing from the spirit and scope of the invention.

What is claimed is:

1. A method of providing acknowledging of receipt of a voice mail message sent by a first user to a second user and accessed by the second user, said first user being connected to a first server, said second user being connected to a second server, said method comprising:

receiving, by the second server, a request from the first user for an acknowledgment message indicating that the second user has accessed the voice mail message sent by the first user to the second user;

responsive to said receiving the request, placing an indication of the request in a voice mail box of the second user, said placing the indication of the request performed by the second server, wherein said placing the indication of the request is performed after the second server receives an indication that the first user is disconnected from the first server; and responsive to the second user accessing the voice mail box of the second user to receive the voice mail message and responsive to the indication of the request in the voice mail box of the second user, sending the acknowledgment message to the first server, said sending the acknowledgment message performed by the second server.

2. The method of claim 1, wherein said placing the indication of the request comprises placing the indication of the request in a voice mail table within the voice mail box of the second user.

3. The method of claim 2, wherein a specific row of the voice mail table of the second user relates to the voice mail message and comprises an Ack field containing a Boolean variable, and wherein the value of Boolean variable in the specific row comprises the indication of the request.

4. The method of claim 3, wherein the specific row further comprises a Caller MSISDN field identifying the first user, a Received Date field identifying the date and time that the voice mail message was received in the voice mail box of the second user, and a Message Pointer field comprising a pointer to a file containing the voice mail message.

5. The method of claim 3, wherein the specific row consists of a Msg ID field uniquely identifying the voice mail message which the request is associated, the Ack field, the Caller MSISDN field, the Received Date field, and the Message Pointer field.

6. The method of claim 1, wherein the method further comprises: notifying the second user that the voice mail message is waiting in the voice mail box of the second user, wherein said notifying is performed by the second server after the second server receives an indication that the first user is disconnected from the first server and before said sending the acknowledgment message to the first server.

7. The method of claim 1, wherein the acknowledgment message comprises a Caller MSISDN identifying the first user, a Called MSISDN identifying the second user, the date and time of creation of the voice mail message by the first user, and the date and time of delivery of the voice mail message to the second user.

8. The method of claim 1, wherein a first Voice mail User Group (VUG) group comprises the first server and a first plurality of subscribers that includes the first user, and wherein a second VUG group comprises the second server and a second plurality of subscribers that includes the second user.

9. A system comprising the second server of claim 1, said second server adapted to execute instructions to perform the method of claim 1.

10. A method of receiving acknowledging of receipt of a voice mail message sent by a first user to a second user and accessed by the second user, said first user being connected to a first server, said second user being connected to a second server, said method comprising:
receiving, by the first server from the second server, an acknowledgment message from the second server, said acknowledgment message indicating that the second user has accessed the voice mail message sent by the first user to the second user; and
responsive to said receiving the acknowledgment message, informing the first user that the second user has accessed the voice mail message sent by the first user to the second user, said informing the first user performed by the first server,
wherein a subscriber acknowledge table is accessible to the first server,
wherein the subscriber acknowledge table comprises an identification of users and an indication of means for contacting each user,
wherein the method further comprises:
after receiving the acknowledgment and before informing the first user, receiving by the first server a response from a query of the subscriber acknowledge table, said query requesting an indication of whether or not an identification of the first user exists in the subscriber acknowledge table;
if the response from the query indicates that said identification of the first user exists in the subscriber acknowledge table, then performing by the first server said informing the first user according to the means for contacting the first user indicated in the subscriber acknowledge table;
if the response from the query indicates that said identification of the first user does not exist in the subscriber acknowledge table, then performing by the first server said informing the first user by an informing mechanism not utilizing information in the subscriber acknowledge table.

11. The method of claim 10, wherein the response from the query indicates that said identification of the first user exists in the subscriber acknowledge table.

12. The method of claim 10, wherein the acknowledgment message comprises a Caller MSISDN identifying the first user, wherein the response from the query indicates that said identification of the first user does not exist in the subscriber acknowledge table, wherein said informing the first user is implemented by a call to the Caller MSISDN identifying the first user, and wherein the call to the Caller MSISDN identifying the first user is triggered by the first server.

13. The method of claim 10, wherein the means for contacting the first user, as indicated in the subscriber acknowledge table, comprises a plurality of different modes for contacting the first user, and wherein the different modes for contacting the first user are prioritized in the subscriber acknowledge table.

14. The method of claim 10, wherein the acknowledgment message comprises a Caller MSISDN identifying the first user, a Called MSISDN identifying the second user, the date and time of creation of the voice mail message by the first user, and the date and time of delivery of the voice mail message to the second user.

15. The method of claim 10, wherein a first Voice mail User Group (VUG) group comprises the first server and a first plurality of subscribers that includes the first user, and wherein a second VUG group comprises the second server and a second plurality of subscribers that includes the second user.

16. The method of claim 15, wherein at least one VUG group of the first VUG group and the second VUG group is based on the New Generation Network architecture.

17. A system comprising the second server of claim 10, said first server adapted to execute instructions to perform the method of claim 10.

* * * * *